United States Patent [19]

Zink

[11] Patent Number: 5,039,822

[45] Date of Patent: Aug. 13, 1991

[54] CHROMOGENIC PHTHALIDES

[75] Inventor: Rudolf Zink, Therwil, Switzerland

[73] Assignee: Ciba-Geigy Corporation, Ardsley, N.Y.

[21] Appl. No.: 395,639

[22] Filed: Aug. 16, 1989

[30] Foreign Application Priority Data

Aug. 17, 1988 [CH] Switzerland .......................... 3072/88

[51] Int. Cl.$^5$ ........................................... C07D 407/04
[52] U.S. Cl. .................................................. 548/463
[58] Field of Search ....................................... 548/463

[56] References Cited

U.S. PATENT DOCUMENTS 4,062,866 12/1977 Garner et al. ................... 260/326.14
4,186,134 1/1980 Garver et al. ................... 260/326.13

FOREIGN PATENT DOCUMENTS 2194070 2/1988 United Kingdom .
2195781 4/1988 United Kingdom .

Primary Examiner—Richard L. Raymond
Attorney, Agent, or Firm—George R. Dohmann; Edward McC. Roberts

[57] ABSTRACT

Chromogenic phthalides of formula

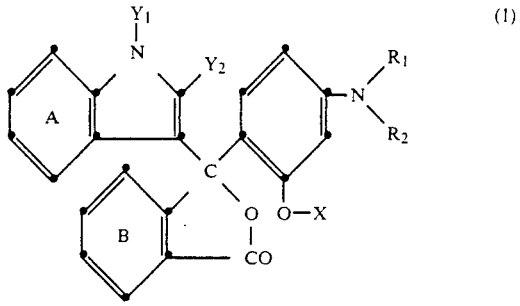

wherein
- $X$, $R_1$ and $R_2$ are each independently of the other $C_3$–$C_6$alkyl,
- $Y_1$ is hydrogen, alkyl of not more than 12 carbon atoms which is unsubstituted or substituted by halogen, hydroxyl, cyano or lower alkoxy, or is acyl or 1 of 12 carbon atoms, benzyl or benzyl which is substituted by halogen, cyano, lower alkyl or lower alkoxy,
- $Y_2$ is hydrogen, lower alkyl or phenyl, and
- the benzene rings A and B are each independently of the other unsubstituted or substituted by halogen, nitro, lower alkyl, lower alkoxy, lower alkylthio, lower alkoxycarbonyl, amino, mono-lower alkylamino, di-lower alkylamino or lower alkanoylamino.

These phthalides are particularly suitable for use as color formers in pressure-sensitive or heat-sensitive recording materials and give intense blue or violet blue colored images.

11 Claims, No Drawings

CHROMOGENIC PHTHALIDES

The present invention relates to chromogenic phthalides, to their preparation, and to the use thereof as colour formers in pressure-sensitive or heat-sensitive recording materials.

The chromogenic phthalides of this invention have the formula

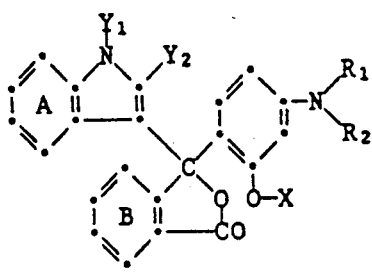

(1)

wherein
- X, $R_1$ and $R_2$ are each independently of the other $C_3$–$C_6$alkyl,
- $Y_1$ is hydrogen, alkyl of not more than 12 carbon atoms which is unsubstituted or substituted by halogen, hydroxyl, cyano or lower alkoxy, or is acyl of 1 of 12 carbon atoms, benzyl or benzyl which is substituted by halogen, cyano, lower alkyl or lower alkoxy,
- $Y_2$ is hydrogen, lower alkyl or phenyl, and
- the benzene rings A and B are each independently of the other unsubstituted or substituted by halogen, nitro, lower alkyl, lower alkoxy, lower alkylthio, lower alkoxycarbonyl, amino, mono-lower alkylamino, di-lower alkylamino or lower alkanoylamino.

Within the scope of the definition of the phthalides, lower alkyl, lower alkoxy and lower alkylthio denote those groups or moieties which contain 1 to 5, preferably 1 to 3, carbon atoms. Examples of lower alkyl groups are: ethyl, n-propyl, isopropyl, n-butyl, sec-butyl, amyl or isoamyl.

Lower alkoxy groups are for example: methoxy, ethoxy, isopropoxy, isobutoxy or tert-butoxy. Lower alkylthio groups are for example: methylthio, ethylthio, propylthio or butylthio.

Halogen is, for example, fluoro, bromo or, preferably, chloro.

Acyl is in particular formyl, lower alkylcarbonyl, e.g. acetyl or propionyl, or benzoyl. Further acyl radicals may be lower alkylsulfonyl, e.g. methylsulfonyl or ethylsulfonyl as well as phenylsulfonyl. Benzoyl and phenylsulfonyl may be substituted by halogen, methyl, methoxy or ethoxy.

X, $R_1$ and $R_2$ may be n-propyl, isopropyl, n-butyl, isobutyl, sec-butyl, n-pentyl, isopentyl or n-hexyl. X, $R_1$ and $R_2$ are preferably identical and are in particular n-propyl or, more particularly, n-butyl.

An alkyl group $Y_1$ may be straight-chain or branched and is, for example, methyl, ethyl, n-propyl, isopropyl, n-butyl, sec-butyl, amyl, isoamyl, n-hexyl, 2-ethyl-n-hexyl, n-heptyl, n-octyl, isooctyl, n-nonyl, isononyl or n-dodecyl.

A substituted alkyl group $Y_1$ is preferably cyanoalkyl, haloalkyl, hydroxyalkyl, alkoxyalkyl, each containing preferably a total of 2 to 6 carbon atoms. Such groups are e.g. β-cyanoethyl, β-chloroethyl, β-hydroxyethyl, γ-hydroxypropyl, β,γ-dihydroxypropyl, β-methoxyethyl, β-ethoxyethyl or γ-methoxypropyl.

Preferred substituents of a benzyl group $Y_1$ are, for example, halogen, methyl or methoxy. Examples of such araliphatic radicals are p-methylbenzyl or o- or p-chlorobenzyl.

The N-substituent $Y_1$ is preferably benzyl, acetyl, propionyl, hydrogen or, preferably, $C_1$–$C_8$alkyl such as methyl, ethyl, n-butyl or n-octyl.

$Y_2$ is preferably phenyl or, most preferably, methyl.

The benzene ring A is preferably not further substituted. If A is substituted, then preferred substituents are halogen, lower alkyl, for example methyl or tert-butyl, or lower alkoxy such as methoxy.

The benzene ring B may conveniently be substituted by halogen, nitro, lower alkyl, lower alkoxy or di-lower alkylamino. The benzene ring B is preferably unsubstituted or substituted by 1 to 4 halogen atoms.

Interesting phthalides are those of formula

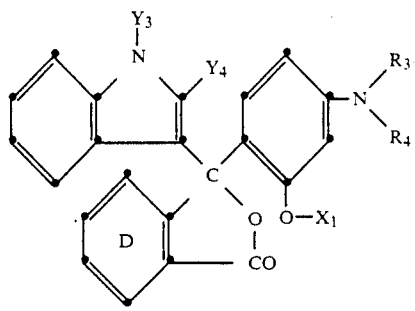

(2)

wherein
- $X_1$, $R_3$ and $R_4$ are propyl, butyl, pentyl, or hexyl,
- $Y_3$ is $C_1$–$C_8$alkyl, and
- $Y_4$ is methyl or phenyl, and
- the benzene ring D is unsubstituted or substituted by halogen, lower alkyl or di-lower alkylamino.

Among the compounds of formula (2), those phthalides are preferred in which the benzene ring D is unsubstituted or substituted by halogen, preferably by 1 to 4 chlorine atoms, and X, $R_3$ and $R_4$ are identical.

Particularly interesting phthalides are those of formula

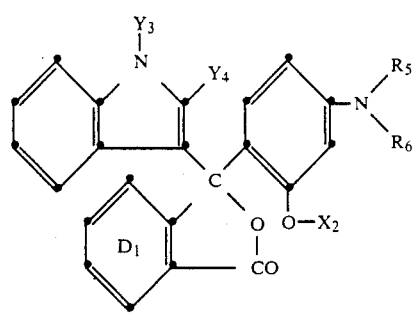

(3)

wherein
- $X_2$, $R_5$ and $R_6$ are each n-propyl or n-butyl,
- $Y_3$ is $C_1$–$C_8$alkyl,
- $Y_4$ is methyl or phenyl, and
- the benzene ring $D_1$ is unsubstituted or substituted by four chlorine atoms.

Among these compounds of formula (3), those phthalides are especially preferred in which $X_2$, $R_5$ and $R_6$ are identical and are preferably n-butyl.

The phthalides of formulae (1) to (3) are novel chromogenic compounds and may be prepared by methods which are known per se. A process for the preparation of the compounds of formula (1) comprises reacting, in any order, 1 mol of an anhydride of formula.

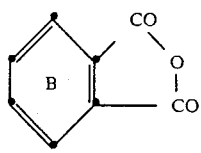

with 1 mol of an indole of formula

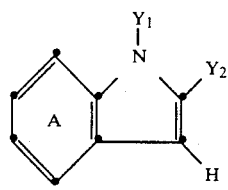

and 1 mol of an aminobenzene of formula

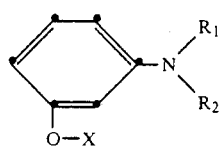

in which formulae (4), (5) and (6) above A, B, $R_1$, $R_2$, X, $Y_1$ and $Y_2$ are as previously defined.

The phthalides of this invention are preferably prepared by reacting a compound of formula

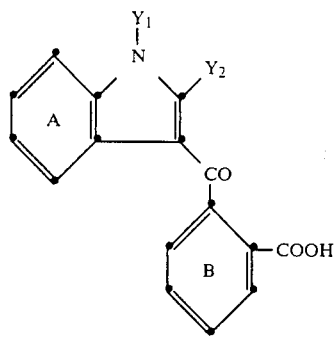

wherein A, B, $Y_1$ and $Y_2$ have the given meanings, with an aminobenzene of formula (6).

The reactions are preferably carried out such that the reactants are reacted in the presence of an acid condensing agent in the temperature range from 20° to 140° C. Examples of such condensing agents are acetic anhydride, zinc chloride, sulfuric acid, phosphoric acid and phosphoroxy chloride. The isolation of the final product of formula (1) is effected in known manner by adjusting the pH of the reaction mixture to not less than 6, preferably to a value from 7 to 11, e.g. with an alkali such as an alkali metal hydroxide, ammonia, an alkali metal carbonate or bicarbonate, isolating, washing and drying the precipitate, or by treatment with a suitable organic solvent such as methanol, isopropanol, benzene, chlorobenzene or, preferably, toluene or toluene/isopropanol.

The phthalides of formula (1) to (3) are normally colourless or, at most, faintly coloured. When these colour formers are brought into contact with a preferably acid developer, i.e. an electron acceptor, then, depending on the developer employed, they develop intense greenish-blue, blue or violet-blue images which are fast to sublimation and light.

The phthalides of formulae (1) to (3) are also very useful when combined with one or more other known colour formers, for example 3,3-bis(aminophenyl)phthalides, 3-indolyl-3-aminophenylazaphthalides, 3-indolyl-3-aminophenyldiazaphthalides, 3,3-bis(indolyl)phthalides, 3,6-bis(alkoxy)fluorans, 3-aminofluorans, 2,6-diaminofluorans, 2,6-diamino-3-methylfluorans, 3,6-bis(diarylamino)fluorans, leucoauramines, spiropyranes, spirodipyranes, chromenoindoles, chromenopyrazoles, phenoxazines, phenothiazines, quinazolines, rhodamine lactams, carbazolylmethanes or other triarylmethaneleuco dyes, to give blue, navy blue, grey or black images.

The phthalides of formulae (1) to (3) develop on activated clays as well as on phenolic substrates an excellent colour intensity and light-fastness. They are especially suitable for use as rapidly developing colour formers in a heat-sensitive or especially in a pressure-sensitive, recording material which can also be a copying material. They are distinguished by the property of being pH-stable and of being very readily soluble in the capsule oils. After exposure on a CB sheet, they exhibit a slight decrease in colour strength (CB decline).

A pressure-sensitive material comprises, for example, at least one pair of sheets which contain at least one colour former of formulae (1) to (3), dissolved in an organic solvent, and an electron acceptor as developer.

Typical examples of such developers are activated clays such as attapulgite, acid clay, bentonite, montmorillonite, activated clay, for example acid-activated bentonite or montmorillonite, and also zeolith, halloysite, silica, alumina, aluminium sulfate, aluminium phosphate, zinc chloride, zinc nitrate, zirconium dioxide, activated kaolin or any clay. Suitable developers are also acidic organic compounds, for example unsubstituted or ring-substituted phenols, resorcinols, salicylic acids such as 3,5-bis(α,α-dimethylbenzyl)salicylic acid or 3,5-bis(α-methylbenzyl)salicylic acid, or salicylates and their metal salts, e.g. zinc salts, or an acidic polymer, for example a phenolic polymer, an alkylphenol acetylene resin, a maleic acid/rosin resin or a partially or completely hydrolysed polymer of maleic acid and styrene, ethylene or vinyl methyl ether, or carboxymethylene. Mixtures of these monomers and polymers may also be used. Particularly preferred developers are acid-activated bentonite, zinc salicylates or the condensates of p-substituted phenols with formaldehyde. These last mentioned compounds may also be modified with zinc.

The developers may also be used in admixture with other basically inert or almost inert pigments or with other auxiliaries such as silica gel or UV absorbers such as 2-(2-hydroxyphenyl)benzotriazoles. Examples of such pigments are: talcum, titanium dioxide, alumina, aluminium hydroxide, zinc oxide, chalk, clays such as kaolin, as well as organic pigments, e.g. urea/formaldehyde condensates (BET surface area: 2–75 m²/g) or melamine/formaldehyde condensates.

The colour former effects a coloured marking at those points where it comes into contact with the electron acceptor. To prevent the colour formers contained in the pressure-sensitive recording material from being activated prematurely, they are usually separated from the electron acceptor. This separation can conveniently be accomplished by incorporating the colour formers in foam-like, sponge-like or honeycomb-like structures. The colour formers are preferably encapsulated in microcapsules, which can normally be ruptured by pressure.

When the capsules are ruptured by pressure, for example with a pencil, the colour former solution is transferred to an adjacent sheet coated with an electron acceptor to produce a coloured image thereon. This colour results from the dye thereby formed and which is absorbed in the visible range of the electromagnetic spectrum.

The colour formers are preferably encapsulated in the form of solutions in organic solvents. Examples of suitable solvents are preferably non-volatile solvents, for example a halogenated paraffin such as chloroparaffin, a halogenated benzene such as trichlorobenzene, or a halogenated diphenyl such as monochlorodiphenyl or trichlorodiphenyl, an ester such as tricresyl phosphate, di-n-butyl phthalate, dioctyl phthalate, trichloroethyl phosphate, an aromatic ether such as benzylphenyl ether, a hydrocarbon oil such as paraffin or kerosene, an alkylated derivative, e.g. an isopropyl, isobutyl, sec- or tert-butyl derivative, of diphenyl, naphthalene or terphenyl; dibenzyl toluene, partially hydrogenated terphenyl, a mono- to tetralkylated diphenylalkane containing 1 to 3 carbon atoms in each of the alkyl moieties; dodecylbenzene, a benzylated xylene, or other chlorinated or hydrogenated, condensed aromatic hydrocarbons. Mixtures of different solvents, especially mixtures of paraffin oils or kerosene and diisopropylnaphthalene or partially hydrogenated terphenyl, are often used to achieve an optimum solubility for the colour formation, a rapid and intense coloration, and a viscosity which is advantageous for the microencapsulation. When encapsulated, the phthalides of this invention are distinguished by excellent solubility and are pH stable, for example in the range from 4 to 10.

The capsules walls can be formed evenly around the droplets of the colour former solution by coacervation, and the encapsulating material is as described e.g. in U.S. Pat. No. 2,800,457. The capsules may also preferably be formed from an aminoplast or a modified aminoplast by polycondensation, as described in British patent specifications 989 264, 1 156 725, 1 301 052 and 1 355 124. Also suitable are microcapsules which are formed by interfacial polymerisation, e.g. capsules formed from polyester, polycarbonate, polysulfonamide, polysulfonate, but in particular from polyamide or polyurethane.

The microcapsules containing the colour formers of formulae (1) to (3) can be used for the production of a wide range of known kinds of pressure-sensitive copying materials. The various systems differ substantially from one another in the arrangement of the capsules and of the colour reactants, and in the nature of the support.

A preferred arrangement is that in which the encapsulated colour former is in the form of a layer on the back of a transfer sheet and the developer is in the form of a layer on the face of a receiver sheet. Another arrangement of the components is that wherein the microcapsules containing the colour former and the developer are in or on the same sheet, in the form of one or more individual layers, or are present in the paper pulp.

The capsules are preferably secured to the support by means of a suitable binder. As paper is the preferred support, these binders are principally paper-coating agents, for example gum arabic, polyvinyl alcohol, hydroxymethylcellulose, casein, methyl cellulose, dextrin, starch or starch derivatives or polymer latices. These last mentioned substances are e.g. butadiene/styrene copolymers or acrylic homopolymers or copolymers.

The paper employed comprises not only normal paper made from cellulose fibres, but also paper in which the cellulose fibres are replaced (partially or completely) by synthetic polymers. The support may also be a plastic sheet.

The copying material preferably comprises a capsule-free layer which contains the colour former and a colour developing layer containing, as colour developer, at least one inorganic metal salt of a polyvalent metal, preferably a halide or a nitrate, for example zinc chloride, zinc nitrate or a mixture thereof.

The compounds of formulae (1) to (3) may also be used as colour formers in a thermoreactive recording material. This recording material usually contains at least one support, one colour former, one electron acceptor and, in some cases, also a binder and/or wax. If desired, the recording material may also contain activators or sensitiser.

Thermoreactive recording systems comprise, for example, heat-sensitive recording or copying materials and papers. These systems are used, for example, for recording information, for example in electronic computers, teleprinters or telewriters, or in recording and measuring instruments, such as electrocardiographs. The image (mark) formation can also be effected manually with a heated pen. Laser beams can also be used to produce heat-induced marks.

The thermoreactive recording material can be composed such that the colour former is dispersed or dissolved in one binder layer and the developer is dissolved or dispersed in the binder in a second layer. An alternative method comprises dispersing both the colour former and the developer in one layer. By means of heat the layer or layers are softened at specific areas, whereupon the desired colour develops at once, at the heated areas.

Suitable developers are the same electron acceptors as are used in pressure-sensitive papers. Examples of developers are the previously mentioned clays and phenolic resins, or also the phenolic compounds described e.g. in German Offenlegungsschrift 1 251 348, for example 4-tert-butylphenol, 4-phenylphenol, methylene-bis(p-phenylphenol), 4-hydroxydiphenyl ether, $\alpha$-naphthol, $\beta$-naphthol, methyl 4-hydroxybenzoate or benzyl 4-hydroxybenzoate, 4-hydroxydiphenylsulfone, 4'-hydroxy-4-methyldiphenylsulfone, 4'-hydroxy-4-isopropoxydiphenylsulfone, 4-hydroxyacetophenone, 2,2'-dihydroxydiphenyl, 4,4'-cyclohexylidenediphenol, 4,4'-isopropylidenediphenol, 4,4'-isopropylidenebis(2-methylphenol), an antipyrine complex of zinc thiocyanate, a pyridine complex of zinc thiocyanate, 4,4'-bis(4-hydroxyphenyl)valeric acid, hydroquinone, pyrogallol, phloroglucinol, p-, m- and o-hydroxybenzoic acid, gallic acid, 1-hydroxy-2-naphthoic acid, as well as boric acid or organic, preferably aliphatic, dicarboxylic acids, for example tartaric acid, oxalic acid, maleic acid, citric acid, citraconic acid or succinic acid.

Fusible, film-forming binders are preferably used for the preparation of the thermoreactive recording material. These binders are normally water-soluble, whereas the phthalides and the developers are sparingly soluble or insoluble in water. The binder should be able to disperse and fix the colour former and the developer at room temperature.

When heat is applied, the binder softens or melts, so that the colour former comes in contact with the developer and a colour is able to form. Examples of binders which are soluble, or at least swellable, in water are hydrophilic polymers such as polyvinyl alcohol, polyacrylic acid, hydroxyethylcellulose, methyl cellulose, carboxymethylcellulose, polyacrylamide, polyvinyl pyrrolidone, gelatin, starch, or etherified corn starch.

If the colour former and the developer are in two separate layers, it is possible to use water-insoluble binders, i.e. binders which are soluble in non-polar or only weakly polar solvents, for example natural rubber, synthetic rubber, chlorinated rubber, alkyd resins, polystyrene, styrene/butadiene copolymers, polymethylacrylates, ethyl cellulose, nitrocellulose or polyvinyl carbazole. The preferred arrangement, however, is that in which the colour former and the developer are contained in one layer in a water-soluble binder.

To ensure the stability of the heat-sensitive recording material or the density of the developed image, the material may be provided with an additional protective layer. Such protective layers consist as a rule of water-soluble and/or water-insoluble resins which are customary polymer materials or aqueous emulsions thereof.

The thermoreactive coatings may contain further modifiers. To improve the degree of whiteness, to facilitate the printing of papers, and to prevent the heated pen from sticking, the coatings may contain, for example, talcum, titanium dioxide, zinc oxide, aluminium hydroxide, calcium carbonate (e.g. chalk), clays or also organic pigments, for example urea/formaldehyde polymers. In order to effect the colour formation only within a limited temperature range, it is possible to add substances such as urea, thiourea, diphenyl thiourea, acetamide, acetanilide, bis(stearoyl)ethylenediamide, benzosulfanilide, stearamide, phthalic anhydride, metal stearates such as zinc stearate, phthalonitrile, dimethyl terephthalate, dibenzyl terephthalate or other suitable fusible products which induce the simultaneous melting of the colour former and the developer. Thermographic recording materials preferably contain waxes, e.g. carnauba wax, montan wax, paraffin wax, polyethylene wax, condensates of higher fatty acid amides and formaldehyde, or condensates of higher fatty acids and ethylenediamine.

A further utility of the compounds of formulae (1) to (3) is the production of a coloured image with the photocurable microcapsules described in German Offenlegungsschrift 3 247 488.

The invention is illustrated by the following Examples in which percentages are by weight, unless otherwise indicated.

EXAMPLE 1

A mixture of 11.4 g of 3-(3',4',5',6'-tetrachloro-2'-carboxybenzoyl)-1-ethyl-2-methylindole and 6.9 g of 3-bis(n-butylamino)phenol n-butyl ether in 30 g of acetic anhydride are heated to 65° C. To this mixture is added 0.2 g of dry zinc chloride and the reaction mixture is heated to 90° C. and kept at this temperature for 5 hours. Then 25 ml of water and 22 ml of a 10N solution of sodium hydroxide are added dropwise to the blue reaction solution. After decantation, the residue is dissolved in toluene and the toluene solution is washed with weakly ammoniacal water. The toluene phase is separated and concentrated, affording 18 g of crude product which is the compound of formula

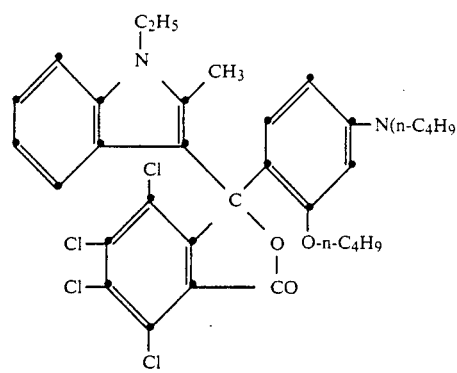

Two recrystallisations from isopropyl alcohol give a colourless compound which has a melting point of 155°–157° C. and excellent solubility in capsule oils.

On acid-modified clay this phthalide develops at once a blue image of very good lightfastness. The intensity and levelness of the coloured image are excellent.

The 3-bis(n-butylamino)phenol n-butyl ether used in this Example is prepared as follows:

22 g of 3-aminophenol are stirred in 112 g of n-butyl bromide. A solution of 48 g of potassium hydroxide in 100 ml of water is added at 20°–30° C. Upon addition of 1 g of tetrabutylammonium bromide, the reaction mixture is heated to reflux and for 8 hours the temperature is kept from 89° C. at the start to 97° C. at the termination of the reaction. After addition of 100 ml of water the organic phase is separated, washed and distilled under a water jet vacuum to give 52.3 g of 3-bis(n-butylaminophenol) n-butyl ether with a boiling point of 194°–197° C./15 mm/Hg.

EXAMPLE 2

A mixture of 9.2 g of 3-(2'-carboxybenzoyl)-1-n-octyl-2-methylindole and 6.9 g of 3-bis(butylamino)-phenol n-butyl ether in 30 g of acetic anhydride is stirred for 20 minutes at 55°–60° C. The resultant solution is poured into 150 ml of water and extracted with toluene at pH 8–10, whereupon the toluene phase is separated and concentrated, to give 15.1 g of an amorphous compound of formula

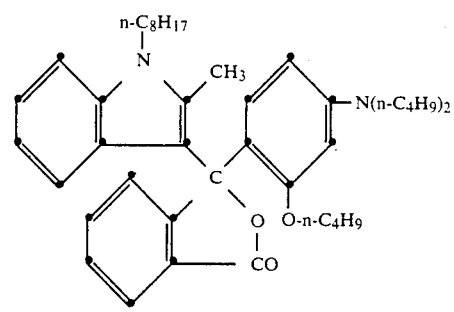

On phenolic resin this compound develops at once a lightfast blue image.

EXAMPLE 3

A mixture of 7.7 g of 3-(2'-carboxybenzoyl)-1-ethyl-2-methylindole and 7.9 g of bis(n-butylamino)phenol n-butyl ether in 30 g of acetic anhydride is stirred for 1 hour at 80°–85° C. Working up as described in Example 1 gives 14 g of a phthalide of formula

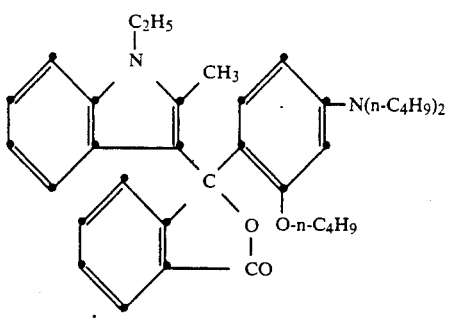

(13)

This amorphous compound has a softening point of 40° C. and develops at once a lightfast blue image on acid-modified clay. The phthalides of formula

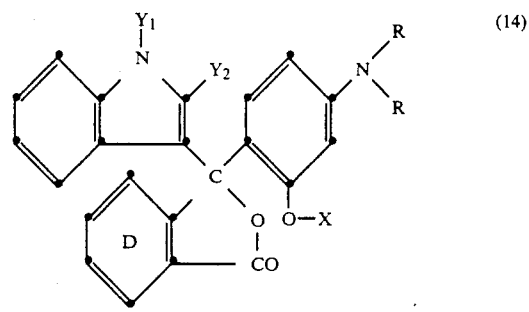

(14)

listed in the following Table are obtained in the same manner as described in Examples 1 to 3, using the appropriate starting materials.

EXAMPLE 10

Preparation of a pressure-sensitive copying paper

A solution of 3 g of the phthalide of formula (11) obtained in Example 1 in 80 g of diisopropylnaphthalene and 17 g of kerosene are microencapsulated by coacervation in a manner known per se with gelatin and gum arabic. The microcapsules are mixed with starch solution and coated on a sheet of paper. The face of a second sheet of paper is coated with activated clay as colour developer. The first sheet containing the colour former and the sheet coated with the developer are laid on top of each other with the coated sides face to face. Pressure is exerted on the first sheet by writing by hand or typewriter and an intense blue copy of excellent lightfastness develops immediately on the sheet coated with the developer.

A comparable intense blue copy is also obtained by using any of the other colour formers of Examples 2 to 9.

EXAMPLE 11

1 g of the phthalide according to Example 1 is dissolved in 17 g of toluene. With stirring, 12 g of polyvinyl acetate, 8 g of calcium carbonate and 2 g of titanium dioxide are added to this solution. The resultant suspension is diluted with toluene in the weight ratio 1:1 and applied to a sheet of paper with a knife to a thickness of 10 μm. On this sheet of paper is laid a second sheet, the underside of which has been coated to a weight of 3 g/m² with a mixture consisting of 1 part of an amide wax, 1 part of a stearin wax and 1 part of zinc chloride. Pressure is exerted on the top sheet by writing by hand or typewriter and an intense lightfast blue copy develops immediately on the sheet coated with the colour former.

EXAMPLE 12

Preparation of a heat-sensitive recording material

In a ball mill, 32 g of 4,4'-isopropylidenediphenol (bisphenol A), 3.8 g of the distearylamide of ethylenediamine, 39 g of kaolin, 20 g of an 88% hydrolysed polyvinyl alcohol and 500 ml of water are ground to a particle size of ca. 5 μm. In a second ball mill, 6 g of the phthalide obtained in Example 1, 3 g of a 88% hydrolysed polyvinyl alcohol and 60 ml of water are ground to a particle size of ca. 3 μm. Both dispersions are mixed and applied to paper to a dry coating weight of 5.5 g/m². An intense blue image of excellent fastness to light and sublimation is produced by contacting the paper with a heated metal stylus.

EXAMPLE 13

1.2 g of the colour former of formula

TABLE

| Ex. | $Y_1$ | $Y_2$ | D | X | R | m.p. in °C. | Colour |
| --- | --- | --- | --- | --- | --- | --- | --- |
| 4 | $CH_3$ | (benzo-fused) | 4,5,6,7-tetra-chloro-subst. | $n-C_4H_9$ | $n-C_4H_9$ | 165–166 | greenish-blue |
| 5 | $C_2H_5$ | $CH_3$ | 4,5,6,7-tetra-chloro-subst. | $n-C_3H_7$ | $n-C_3H_7$ | 180–182 | blue |
| 6 | $n-C_8H_{17}$ | $CH_3$ | 4,5,6,7-tetra-chloro-subst. | $n-C_4H_9$ | $n-C_4H_9$ | 119–120 | blue |
| 7 | $n-C_6H_{13}$ | $CH_3$ | 5/6 $NO_2$-subst. | $n-C_4H_9$ | $n-C_4H_9$ | <20 (oil) | blue |
| 8 | $C_2H_5$ | $CH_3$ | 4,5,6,7-tetra-chloro-subst. | $n-C_6H_{13}$ | $n-C_6H_{13}$ | 87–89 | blue |
| 9 | $C_8H_{17}$ | $CH_3$ | 5/6-tert-butyl-subst. | $n-C_4H_9$ | $n-C_4H_9$ | <20 (oil) | blue |

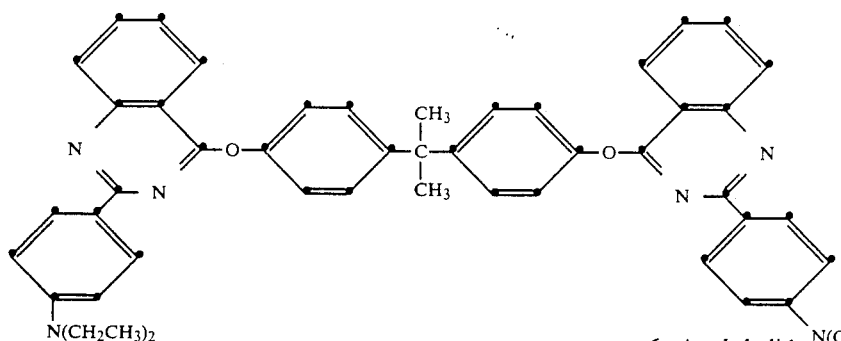

0.6 g of 3,3-bis(1'-n-octyl-2'-methylindol-3'-yl)phthalide, 0.6 g of N-butylcarbazol-3-yl-bis(4'-N-methyl-N-phenylaminophenyl)methane and 1.2 g of the phthalide according to Example 1 are dissolved in 100 g of partially hydrogenated terphenyl at 70°–80° C. The cooled solution is applied with a photogravure machine to a presized paper which is coated with activated clay. An intense and lightfast black image develops immediately.

What is claimed is:

1. A chromogenic phthalide of formula

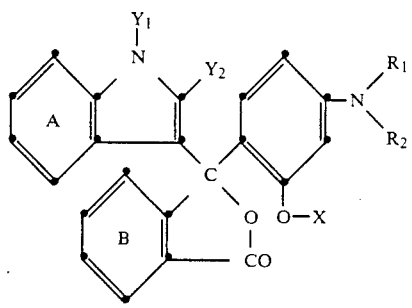

(1)

wherein

X, $R_1$ and $R_2$ are each independently of the other $C_4$–$C_6$alkyl, $Y_1$ is hydrogen, alkyl of not more than 12 carbon atoms which is unsubstituted or substituted by halogen, hydroxyl, cyano or lower alkoxy, or is acyl of 1 of 12 carbon atoms, benzyl or benzyl which is substituted by halogen, cyano, lower alkyl or lower alkoxy, $Y_2$ is hydrogen, lower alkyl or phenyl, and the benzene rings A and B are each independently of the other unsubstituted or substituted by halogen, nitro, lower alkyl, lower alkoxy, lower alkylthio, lower alkoxycarbonyl, amino, mono-lower alkylamino, di-lower alkylamino or lower alkanoylamino.

2. A phthalide according to claim 1, wherein X, $R_1$ and $R_2$ are identical.

3. A phthalide according to claim 1, wherein $Y_1$ is hydrogen, $C_1$–$C_8$alkyl, acetyl, propionyl or benzyl.

4. A phthalide according to claim 1, wherein $Y_2$ is methyl or phenyl.

5. A phthalide according to claim 1, wherein the benzene rings A and B are unsubstituted or substituted by halogen, nitro, lower alkyl, lower alkoxy or di-lower alkylamino.

6. A phthalide according to claim 1, wherein the benzene ring B is unsubstituted or substituted by 1 to 4 halogen atoms.

7. A phthalide according to claim 1, wherein the ring A is unsubstituted or substituted by halogen, lower alkyl or lower alkoxy.

8. A phthalide according to claim 1 of formula

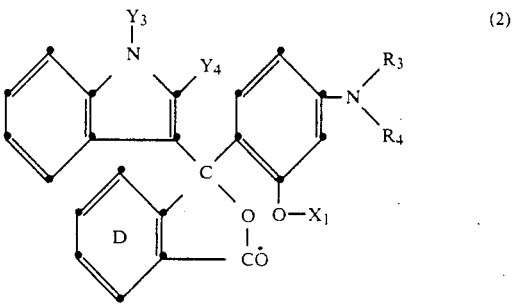

(2)

wherein $X_1$, $R_3$ and $R_4$ are butyl, pentyl or hexyl, $Y_3$ is $C_1$–$C_8$alkyl, and $Y_4$ is methyl or phenyl, and the benzene ring D is unsubstituted or substituted by halogen, lower alkyl or di-lower alkylamino.

9. A phthalide according to claim 8, wherein the benzene ring D is unsubstituted or substituted by 1 to 4 halogen atoms, and $X_1$, $R_3$ and $R_4$ are identical.

10. A phthalide according to claim 1 of formula

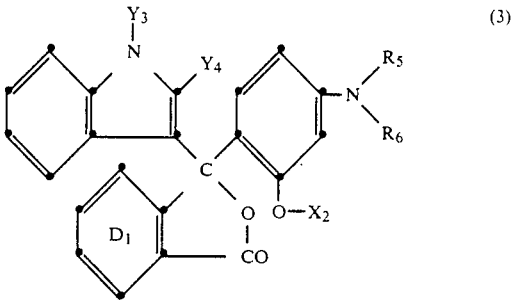

(3)

wherein $X_2$, $R_5$ and $R_6$ are each n-butyl, $Y_3$ is $C_1$–$C_8$alkyl, $Y_4$ is methyl or phenyl, and the benzene ring $D_1$ is unsubstituted or substituted by four chlorine atoms.

11. A phthalide according to claim 10, wherein $Y_3$ is ethyl, n-butyl or n-octyl, $Y_4$ is methyl, $X_2$, $R_5$ and $R_6$ are n-butyl and the benzene ring $D_1$ is substituted by four chlorine atoms.

* * * * *